United States Patent

[11] 3,609,669

[72] Inventors Carl J. Weiss
New Berlin;
Gilbert W. Wierschke, Milwaukee, both of Wis.

[21] Appl. No. 26,501
[22] Filed Apr. 8, 1970
[45] Patented Sept. 28, 1971
[73] Assignee Cutler-Hammer, Inc.
Milwaukee, Wis.

[54] VARIABLE INFORMATION INPUT SYSTEM
5 Claims, 1 Drawing Fig.

[52] U.S. Cl. .......... 340/172.5
[51] Int. Cl. .......... G06f 3/00
[50] Field of Search .......... 340/172.5

[56] References Cited
UNITED STATES PATENTS

| | | | |
|---|---|---|---|
| 3,151,312 | 9/1964 | Beck .......... | 340/172.5 |
| 3,210,732 | 10/1965 | Briggs et al. .......... | 340/172.5 |
| 3,245,040 | 4/1966 | Burdett et al. .......... | 340/172.5 |
| 3,274,909 | 9/1966 | Hauerbach .......... | 95/4.5 |
| 3,398,403 | 8/1968 | Ostendorf, Jr. .......... | 340/172.5 |

*Primary Examiner*—Gareth D. Shaw
*Attorney*—Hugh R. Rather

ABSTRACT: An input system for a computer that detects when there has been a change in process information and signals the computer to pulse a shift register to the new information setting whereby the new process information is put into the computer as soon as it occurs.

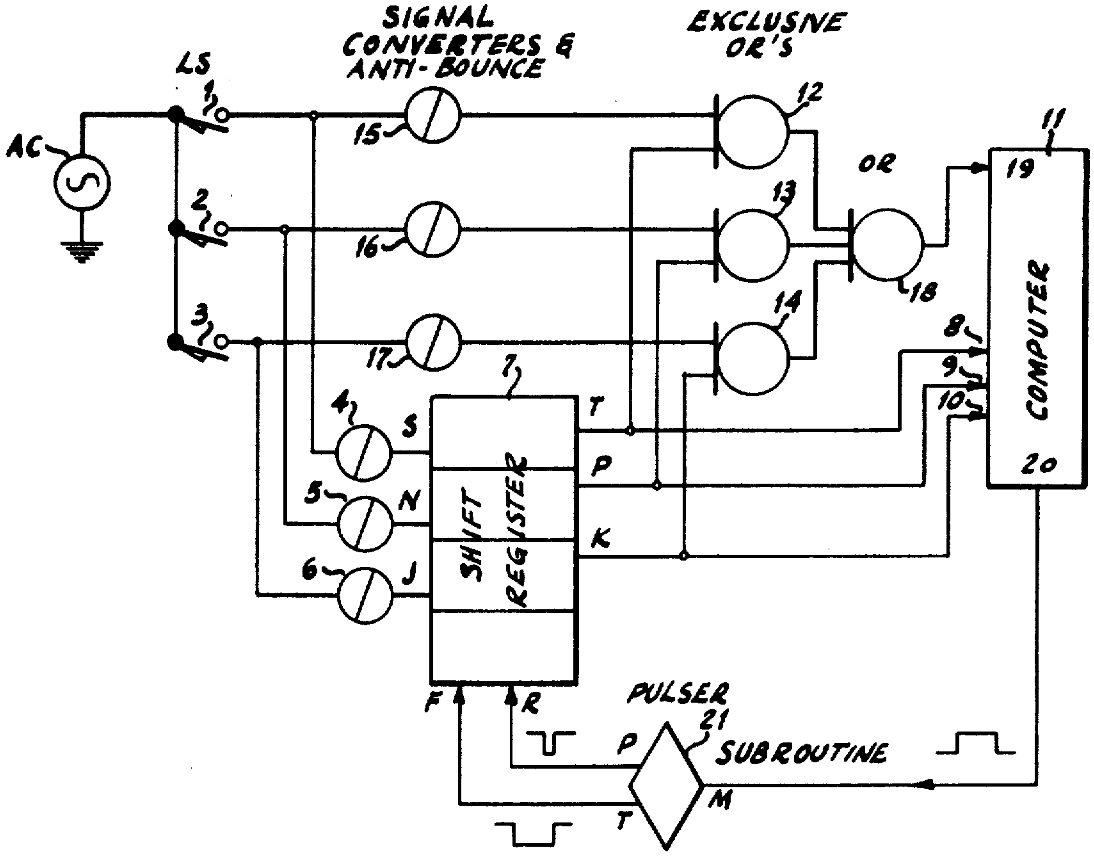
Inventors
Carl J. Weiss
Gilbert W. Wierschke
By Wm. A. Autio
Attorney

VARIABLE INFORMATION INPUT SYSTEM

BACKGROUND OF THE INVENTION

The normal mode of putting process information into a computer has been by way of periodic scanning. For example, process information indicated by the operating condition of a plurality of limit switches or the like has been registered in a shift register and the output of the shift register has been applied to the computer. In order to update the information input, it has been the practice to scan the limit switches on a time basis, for example, every one-fourth second, and to reset the shift register if there has been a change in the conditions of the limit switches. During this updating time, the computer cannot be used for its normal computational function. In order to reduce the updating time and the time that the computer cannot be used for its normal computational function, it has been found desirable to update the computer only when a change has occurred in the process information and to do this immediately following such change.

SUMMARY OF THE INVENTION

This invention relates to improvements in process data input systems.

An object of the invention is to provide an improved variable information input system.

A more specific object of the invention is to provide an improved computer input system that registers process information in a shift register, detects when a change has occurred in the process information and thereupon initiates an operation that triggers the shift register to the new process information setting whereby the new process information goes from the shift register into the computer immediately within a few microseconds.

Other objects and advantages of the invention will hereinafter appear.

BRIEF DESCRIPTION OF THE DRAWINGS

The single FIG. of the drawing shows a variable information input system constructed in accordance with the invention.

DESCRIPTION OF THE PREFERRED EMBODIMENT

Referring to the drawing, there is shown a variable information system for supplying input information to a computer.

The process information that is to be put into the computer is represented in the drawing by the operating conditions of a plurality of limit switches 1, 2 and 3. The left sides of these limit switches are connected to one side of an alternating current source AC, having its other side connected to ground. The right sides of these limit switches are connected through signal converters 4, 5 and 6 to input terminals S, N and J, respectively, of a shift register 7.

The process information as depicted by the open and closed conditions of the limit switches is registered in the shift register. This process information is then applied from output terminals T, P and K of the shift register to input terminals 8, 9 and 10, respectively, of computer 11.

The upper portion of the system in the drawing shows means for detecting a change in the process information. This means comprises three exclusive OR logics 12, 13 and 14, each having two inputs and an output. The right sides of the limit switches are are also connected through signal converters 15, 16 and 17 to first inputs of the exclusive-OR logics, respectively. Outputs T, P and K of the shift register are connected to second inputs of the exclusive-OR logics, respectively. The aforesaid detecting means also comprises a three input OR logic 18. The outputs of the three exclusive-OR logics are connected to the three inputs, respectively, of the OR logic. The output of the OR logic is connected to control input 19 of the computer.

For the purpose of triggering the shift register to a new process information setting, the computer is provided with a subroutine output 20 whereby a triggering pulse is applied to a pulser 21. The long pulse output T of the pulser is connected to the gate input F of the shift register. The short pulse output P of the pulser is connected to the step input R of the shift register.

Since the components of the system are well-known digital and logic circuits, they have been shown schematically to avoid complicating the drawing. The logic power supply is 10 volts DC. The positive side of the power supply, hereinafter referred to as "common, " is defined as logic "1." The negative side of the logic power supply is defined as logic "0".

Signal converters 4,5, 6, 15, 16 and 17 are alike and convert a 110 volt alternating current input from source AC to a 10 volt DC output suitable for use in the shift register and exclusive-OR logics. The signal converter output is at common voltage when the limit switch is closed and is at negative ten volts when the limit switch is open. A signal converter such as the Cutler-Hammer Transformer Converter A72–1284–6 may be used therefor. This signal converter includes a transformer for reducing the voltage, a rectifier and filter to provide filtered DC a voltage divider and a diode clamp to maintain the output at 10 volts DC, and a capacitor and a resistor for antibounce, that is, for preventing bouncing of the limit switches from sending pulses through the signal converter.

Shift register 7 may be a Cutler-Hammer DSL Five-Bit Shift Register Board No. 13. In this type of shift register, information may be inserted by parallel gating. That is, a common voltage signal is placed on one or more inputs S, N and J. Only three of the five inputs and three of the five outputs ares shown for simplicity. A long negative pulse, common to negative 5 volts, is then applied to gate terminal F for about 150 microseconds. At the end of this pulse when terminal F goes back to common voltage, a short negative pulse, common to negative 5 volts, is applied to step terminal R. For each input S, N and J that had a common voltage signal, this long pulse causes the corresponding output T, P and K to shift to common voltage while the short pulse resets all of the other outputs to negative 10 volts. While the shift register is also capable of shifting functions, only its parallel gating function is used in this system.

Exclusive-OR logics 12, 13 and 14 are alike and may be of the type disclosed in G. R. Hearn et al. U.S. Pat. No. 3,309,531 dated Mar. 14, 1967. In such exclusive-OR logic, the output is "1" if the two inputs are different. The output is "0" if the two inputs are the same.

Or logic 18 may be of the well-known type such as the Cutler-Hammer DSL Three Input OR Board No. 2. It provides an output if any one of the three inputs receives an input signal.

Pulser 21 may be a Cutler-Hammer DSL Dynamic Pulser Board No. 28. This pulser upon receiving a positive pulse, negative 10 volts to common, at its input M operates to provide a long negative pulse, common to negative 5 volts or the like, for 150 microseconds at its output T. At the end of this long pulse, the pulser operates to provide a short negative pulse, common to negative 5 volts or the like, for 5 microseconds at its output P. Thus, the pulser will provide the negative-going pulses required for parallel gating of the shift register.

The operation of the system will now be described. Let it be assumed that process information depicted by the closure of limit switch 1, limit switches 2 and 3 being open, has already been put into the system. As a result of this, common voltage is applied from signal converters 4 and 15 to input S of the shift register and to the upper input of exclusive-OR logic 12. The common voltage at input S has resulted in common voltage being applied from output T of the shift register to the lower input of exclusive-OR logic 12 and to input 8 of computer 11.

Since the two inputs of exclusive OR logic 12 are the same, that is, common voltage, its output is "0."

Both inputs of exclusive-OR logics 13 and 14 also are the same, that is, negative 10 volts, so that their outputs are "0."

The process information now changes and this is indicated by closure of limit switch 2 so that limit switches 1 and 2 are closed and limit switch 3 is open. This causes common voltage to be applied from signal converter 5 to input N of the shift register. This also causes common voltage to be applied from signal converter 16 to the upper input of exclusive-OR logic 13. Negative 10 volts is still being applied from output P of the shift register to the lower input of exclusive-OR logic 13.

Since the two inputs are now different, exclusive-OR logic 13 now provides a "1" output, that is, common voltage. This is applied to an input or logic 18 causing the latter to apply a common voltage output to control terminal 19 of the computer.

As hereinbefore mentioned, such a signal at terminal 19 causes the computer to go into a subroutine operation wherein its normal computational function is interrupted and a common voltage pulse is transmitted from its terminal 20.

This common voltage pulse at input M of pulser 21 causes the latter to produce the aforementioned long and short pulses at its outputs T and P, respectively. These pulses are applied to gate terminal F and step terminal R of the shift register to cause parallel gating thereof. As a result, the shift register now provides common voltage signals from its outputs T and P to inputs 8 and 9 of the computer. Output K of the shift register remains at negative 10 volts. Thus, the new process information has been transferred to the computer as soon as it has occurred without awaiting any scanning interval or the like. Also, minimum interruption of the computer operation has occurred.

The common voltage at output P of the shift register is also applied to the lower input of exclusive-OR logic 13. The two inputs on each exclusive OR logic now are the same so that the output of OR logic 18 shifts back to negative 10 volts to terminate the control function.

The system now remains in this condition with no interruption in computer operation for scanning or the like until another change in process information occurs. At such time, the system reoperates as hereinbefore described to parallel gate the shift register whereby it puts the new information into the computer.

While the system hereinbefore described is effectively adapted to fulfill the objects stated, it is to be understood that the invention is not intended to be confined to the particular preferred embodiment of variable information input system disclosed, inasmuch as it is susceptible of various modifications without unduly departing from the scope of the appended claims.

We claim:

1. A variable information input system for a utilization device comprising:

switching means operable in accordance with variation in the input information;

registering means connected to said switching means and being operable by a gating signal for registering the input information indicated by said switching means and for providing an output signal to the utilization device in accordance therewith;

coincidence means connected to said switching means and the output of said registering means for providing a control signal when the input information varies so that it differs from the output of said registering means;

the utilization device being operable by said control signal to transmit a trigger signal; and means responsive to said trigger signal for providing a gating signal to gate said registering means in accordance with the new input information.

2. The invention defined in claim 1, wherein:

said switching means comprises a plurality of limit switches that are closed in combination according to the input information;

and electrical signal connected by the closed limit switches to said registering means and to said coincidence means;

and said registering means comprises a shift register having inputs to which said electrical signal is connected by said limit switches and outputs connected to said coincidence means.

3. The invention defined in claim 2, wherein said coincidence means comprises:

a plurality of exclusive-OR logic circuits, one for each bit of input information, and each having two inputs;

means connecting said limit switches to first inputs of the respective exclusive-OR logic circuits;

and means connecting the outputs of said shift register to second inputs of the respective exclusive-OR logic circuits.

4. The invention defined in claim 3, wherein said coincidence means also comprises:

an OR logic circuit having its inputs connected to the outputs of the exclusive-OR logic circuits and having its output connected to the utilization device.

5. A computer input system for detecting the occurrence of a change in process information and for promptly inserting the new information into the computer comprising:

an electrical voltage source;

a plurality of limit switches connected to said voltage source and being adapted to be closed in combination representative of the process information;

a shift register having a plurality of inputs and a corresponding plurality of outputs and means for receiving a parallel gating control signal;

means connecting said limit switches to the respective inputs of the shift register to apply input signals in accordance with the closed limit switches;

means connecting the shift register outputs to the computer to transfer process information thereto;

said shift register being operable on receipt of a parallel gating control signal to provide output signals at those outputs corresponding to closed limit switch inputs;

noncoincidence detecting means having pairs of inputs;

means connecting said limit switches and said shift register outputs to the inputs of the respective pairs thereof in said noncoincidence detecting means;

said noncoincidence detecting means being operable to provide a control signal whenever the process information as indicated by the limit switch conditions is at a variance with the process information as indicated by the outputs of the shift register;

means for applying said control signal to the computer to enable the later to initiate a subroutine whereby to provide a process information updating control pulse;

and means responsive to said control pulse for applying said parallel gating control signal to the shift register to reset the latter in accordance with the new process information indicated by the conditions of the limit switches.